(12) United States Patent
Fukada et al.

(10) Patent No.: US 10,723,651 B2
(45) Date of Patent: Jul. 28, 2020

(54) METHOD FOR MANUFACTURING REINFORCED GLASS PLATE, AND METHOD FOR MANUFACTURING GLASS PLATE FOR REINFORCEMENT

(71) Applicant: Nippon Electric Glass Co., Ltd., Shiga (JP)

(72) Inventors: Mutsumu Fukada, Shiga (JP); Toshiyuki Kajioka, Shiga (JP); Kiyotaka Kinoshita, Shiga (JP); Hiroshi Sasaki, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 147 days.

(21) Appl. No.: 15/560,224

(22) PCT Filed: Mar. 15, 2016

(86) PCT No.: PCT/JP2016/058180
§ 371 (c)(1),
(2) Date: Sep. 21, 2017

(87) PCT Pub. No.: WO2016/152657
PCT Pub. Date: Sep. 29, 2016

(65) Prior Publication Data
US 2018/0057400 A1    Mar. 1, 2018

(30) Foreign Application Priority Data
Mar. 25, 2015    (JP) .................................. 2015-062338

(51) Int. Cl.
C03B 33/07    (2006.01)
C03C 21/00    (2006.01)
(Continued)

(52) U.S. Cl.
CPC ............ *C03C 21/002* (2013.01); *C03B 33/02* (2013.01); *C03C 3/083* (2013.01); *C03C 17/22* (2013.01);
(Continued)

(58) Field of Classification Search
CPC .............................. C03C 21/00; C03B 33/074
See application file for complete search history.

(56) References Cited

U.S. PATENT DOCUMENTS

| | | | |
|---|---|---|---|
| 2003/0027000 A1 | 2/2003 | Greenberg et al. | |
| 2005/0056806 A1* | 3/2005 | Ellison | C03C 17/25 252/62.3 R |

(Continued)

FOREIGN PATENT DOCUMENTS

| | | |
|---|---|---|
| CN | 1541196 | 10/2004 |
| CN | 103502167 | 1/2014 |

(Continued)

OTHER PUBLICATIONS

International Search Report dated Jun. 21, 2016 in International (PCT) Application No. PCT/JP2016/058180.
(Continued)

*Primary Examiner* — Cynthia Szewczyk
(74) *Attorney, Agent, or Firm* — Wenderoth, Lind & Ponack, L.L.P.

(57) ABSTRACT

Provided is a method of manufacturing a tempered glass sheet that has been tempered by an ion exchange process, the method including: a film forming step of covering a surface of an original glass sheet with an ion permeation suppressing film configured to suppress permeation of an alkali metal ion, to thereby provide a glass sheet with a film; a processing step of subjecting, after the film forming step, the glass sheet with a film to at least any one of cutting processing, end-surface processing, and hole-opening processing, to
(Continued)

thereby provide a glass sheet to be tempered including an exposed portion free from being covered with the ion permeation suppressing film; and a tempering step of chemically tempering, after the processing step, the glass sheet to be tempered by the ion exchange process to provide a tempered glass sheet.

16 Claims, 3 Drawing Sheets

(51) Int. Cl.
    *C03B 33/02*     (2006.01)
    *C03C 17/22*     (2006.01)
    *C03C 3/083*     (2006.01)
    *C03C 17/34*     (2006.01)
    *C03C 17/245*     (2006.01)

(52) U.S. Cl.
    CPC .......... *C03C 17/245* (2013.01); *C03C 17/34* (2013.01); *C03C 17/3417* (2013.01); *C03C 21/00* (2013.01); *C03C 2217/212* (2013.01); *C03C 2217/214* (2013.01); *C03C 2217/215* (2013.01); *C03C 2217/216* (2013.01); *C03C 2218/154* (2013.01); *Y02P 40/57* (2015.11)

(56) References Cited

U.S. PATENT DOCUMENTS

| | | | |
|---|---|---|---|
| 2006/0263610 A1 | 11/2006 | Greenberg et al. | |
| 2010/0233473 A1 | 9/2010 | Greenberg et al. | |
| 2012/0052302 A1* | 3/2012 | Matusick | C03C 15/00 428/410 |
| 2012/0064306 A1* | 3/2012 | Kang | C03B 33/074 428/192 |
| 2012/0134025 A1* | 5/2012 | Hart | C03C 15/00 359/601 |
| 2012/0236477 A1* | 9/2012 | Weber | C03C 21/003 361/679.01 |
| 2012/0280373 A1 | 11/2012 | Feng et al. | |
| 2012/0288681 A1* | 11/2012 | Sondergard | C03C 14/004 428/156 |
| 2013/0149434 A1* | 6/2013 | Oh | C03B 33/074 427/58 |
| 2013/0155004 A1* | 6/2013 | Yoshikawa | C03B 33/074 345/174 |
| 2013/0260105 A1* | 10/2013 | Lee | B32B 17/10036 428/192 |
| 2014/0090864 A1* | 4/2014 | Paulson | C03C 17/225 174/50 |
| 2015/0274585 A1* | 10/2015 | Rogers | C03C 21/002 361/679.26 |
| 2015/0329418 A1 | 11/2015 | Murata et al. | |
| 2016/0002103 A1* | 1/2016 | Wang | C03C 15/00 428/141 |

FOREIGN PATENT DOCUMENTS

| | | |
|---|---|---|
| JP | 2014-208570 | 11/2014 |
| JP | 2015-101533 | 6/2015 |
| WO | 03/006393 | 1/2003 |
| WO | 2012/154536 | 11/2012 |
| WO | 2014/156577 | 10/2014 |

OTHER PUBLICATIONS

International Preliminary Report on Patentability dated Sep. 26, 2017 in International (PCT) Application PCT/JP2016/058180.
Office Action dated Jun. 4, 2019 in Chinese Patent Application No. 201680004512.2 with English translation of the Chinese Search Report.

\* cited by examiner

METHOD FOR MANUFACTURING REINFORCED GLASS PLATE, AND METHOD FOR MANUFACTURING GLASS PLATE FOR REINFORCEMENT

TECHNICAL FIELD

The present invention relates to a method of manufacturing a tempered glass sheet, and more specifically, to a method of manufacturing a tempered glass sheet that has been chemically tempered by an ion exchange process.

BACKGROUND ART

In a touch panel display to be mounted on an electronic device, for example, a smartphone or a tablet PC, a tempered glass sheet that has been chemically tempered has hitherto been used as a cover glass.

Such tempered glass sheet is generally manufactured by chemically treating a glass sheet containing an alkali metal as a composition with a tempering liquid to form a compressive stress layer on a surface. The tempered glass sheet includes the compressive stress layer on a main surface, and hence has improved resistance to impact on the main surface. Meanwhile, in the tempered glass sheet, a tensile stress layer is formed in conformity with the compressive stress layer on the main surface. Then, there has been a problem of breakage (so-called self-destruction) caused by extension of a crack on an end surface due to the tensile stress. Further, there has been a problem in that, when the compressive stress layer is formed to be thin over the glass sheet in order to decrease the tensile stress, sufficient impact resistance is not obtained on the end surface.

In order to solve the above-mentioned problem, there has been developed a technology involving appropriately setting the balance in compressive stress between the main surface and the end surface of the tempered glass sheet, to thereby reduce an internal tensile stress within an appropriate range. For example, in Patent Literature 1, there is disclosed a technology involving forming a film on the main surface in advance to suppress the degree of progress of chemical tempering from the end surface, to thereby control the depth of the compressive stress layer of the main surface to reduce the internal tensile stress without reducing the compressive stress layer of the end surface.

CITATION LIST

Patent Literature 1: JP 2014-208570 A

SUMMARY OF INVENTION

Technical Problem

In Patent Literature 1, there is disclosed a tempered glass in which the balance in compressive stress between the main surface and the end surface is appropriately set. However, in Patent Literature 1, a method of efficiently manufacturing the tempered glass is not sufficiently considered, and hence this tempered glass is susceptible to improvement.

The present invention has been made in view of the above-mentioned circumstances, and an object of the present invention is to enable a tempered glass sheet, which is less liable to cause self-destruction and has high impact resistance in the end surface, to be efficiently manufactured.

Solution to Problem

According to one embodiment of the present invention, there is provided a method of manufacturing a tempered glass sheet that has been tempered by an ion exchange process, the method comprising: a film forming step of covering a surface of an original glass sheet with an ion permeation suppressing film configured to suppress permeation of an alkali metal ion, to thereby provide a glass sheet with a film; a processing step of subjecting, after the film forming step, the glass sheet with a film to at least any one of cutting processing, hole-opening processing, and end-surface processing, to thereby provide a glass sheet to be tempered including an exposed portion free from being covered with the ion permeation suppressing film; and a tempering step of chemically tempering, after the processing step, the glass sheet to be tempered by the ion exchange process to provide a tempered glass sheet.

With the above-mentioned configuration, the balance between the tensile stress of the tempered glass sheet and the compressive stress of the end surface can be suitably adjusted with ease by performing the processing step, for example, cutting, after the film forming step and before the tempering step. Thus, a tempered glass sheet having high impact resistance in the end surface can be efficiently manufactured.

It is preferred that the film forming step comprise forming, as the ion permeation suppressing film, at least any one of a metal oxide film, a metal nitride film, a metal carbide film, a metal oxynitride film, a metal oxycarbide film, and a metal carbonitride film.

With such configuration, the breakage of the ion permeation suppressing film in the processing step and the tempering step can be suppressed.

It is preferred that the film forming step comprise forming, as the ion permeation suppressing film, a film layer containing at least any one of $SiO_2$, $Al_2O_3$, SiN, SiC, AlN, $ZrO_2$, $TiO_2$, $Ta_2O_5$, $Nb_2O_5$, $HfO_2$, and $SnO_2$.

It is preferred that the film forming step comprise forming, as the ion permeation suppressing film, an inorganic film having a composition containing, in terms of mass %, 60% to 96% of $SiO_2$ and 4% to 40% of $Al_2O_3$ to a thickness of from 5 nm to 300 nm.

It is preferred that the film forming step comprise forming, as the ion permeation suppressing film, an inorganic film having a composition containing, in terms of mass %, 99% or more of $SiO_2$.

With such configuration, an ion permeation suppressing film having a high ion permeation suppressing effect and strength can be formed through use of a relatively inexpensive material.

It is preferred that the film forming step comprise forming the ion permeation suppressing film to a thickness of from 20 nm to 150 nm.

With such configuration, high strength is obtained regarding various modes of destruction.

It is preferred that the ion permeation suppressing film have a Young's modulus that is from 0.5 time to 2.0 times a Young's modulus of the original glass sheet.

It is preferred that the following expression (1) be satisfied:

$$n1-n2 \le 0.4 \quad (1)$$

where n1 represents a refractive index of the ion permeation suppressing film, and n2 represents a refractive index of the original glass sheet.

With such configuration, the function of an antireflective film can be obtained in the ion permeation suppressing film.

It is preferred that the tempering step comprise immersing the glass sheet to be tempered in a potassium nitrate molten salt at from 350° C. to 500° C. for from 2 hours to 24 hours.

It is preferred that the original glass sheet contain as a glass composition in terms of mass %, 45% to 75% of $SiO_2$, 10 to 30% of $Al_2O_3$, 0% to 20% of $Na_2O$, and 0% to 20% of $K_2O$ and have a thickness of from 0.01 mm to 1.5 mm.

It is preferred that the method of manufacturing a tempered glass sheet further comprise a step of forming an easy peeling film between the ion permeation suppressing film and the original glass sheet.

It is preferred that the easy peeling film comprise an inorganic film containing at least any one of $In_2O_3$ and ZnO.

With such configuration, the ion permeation suppressing film can be easily peeled without using a solvent that is highly toxic to human bodies, for example, HF.

It is preferred that the method of manufacturing a tempered glass sheet further comprise, after the tempering step, a peeling step of peeling the ion permeation suppressing film from at least one main surface of the tempered glass sheet.

With such configuration, the remaining ion permeation suppressing film can be utilized as a functional film, for example, an antireflective film.

According to one embodiment of the present invention, there is provided a method of manufacturing a glass sheet to be tempered that is subjected to tempering treatment using an ion exchange process, the method comprising: a film forming step of covering a surface of an original glass sheet with an ion permeation suppressing film configured to suppress permeation of an alkali metal ion, to thereby provide a glass sheet with a film; and a processing step of subjecting, after the film forming step, the glass sheet with a film to at least any one of cutting processing, hole-opening processing, and end-surface processing, to thereby form an exposed portion free from being covered with the ion permeation suppressing film in the glass sheet with a film.

DESCRIPTION OF EMBODIMENTS

Now, a tempered glass sheet and a manufacturing method therefor, and a glass sheet to be tempered and a manufacturing method therefor according to an embodiment of the present invention are described.

FIG. 1A to FIG. 1E are each a view for illustrating an example of a method of manufacturing a tempered glass sheet and a glass sheet to be tempered according to the embodiment of the present invention. Tempered glass sheets G4 and G5 according to this embodiment have high resistance to impact on an end surface while having a reduced internal tensile stress because the balance in magnitude between a compressive stress value of a main surface and a compressive stress value of an end surface is suitably controlled in a manufacturing process. The detail thereof is described below.

Figure 1A:
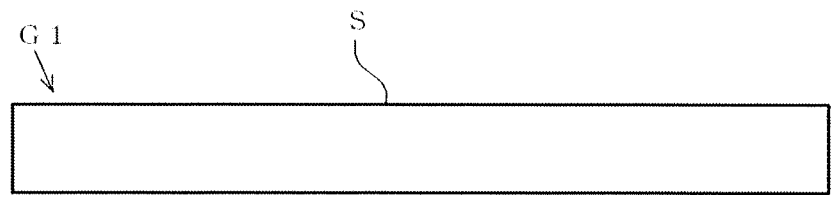
FIG. 1A is a view for illustrating an example of a method of manufacturing a tempered glass sheet and a glass sheet to be tempered according to an embodiment of the present invention.

First, the treatment in a preparation step illustrated in FIG. 1A is performed. The preparation step is a step of preparing an original glass sheet G1. The original glass sheet G1 is a glass that can be tempered by an ion exchange process.

It is preferred that the original glass sheet G1 contain as a glass composition in terms of mass %, 45% to 75% of $SiO_2$, 1% to 30% of $Al_2O_3$, 0% to 20% of $Na_2O$, and 0% to 20% of $K_2O$. When the glass composition range is regulated as described above, both the ion exchange performance and the devitrification resistance are easily satisfied at high level.

The sheet thickness of the original glass sheet G1 is, for example, 1.5 mm or less, preferably 1.3 mm or less, 1.1 mm or less, 1.0 mm or less, 0.8 mm or less, 0.7 mm or less, 0.6 mm or less, 0.5 mm or less, 0.4 mm or less, 0.3 mm or less, or 0.2 mm or less, particularly preferably 0.1 mm or less. As the sheet thickness of a tempered glass substrate is smaller, the tempered glass substrate can be reduced in weight. As a result, a device can be reduced in thickness and weight. It is preferred that the sheet thickness of the original glass sheet G1 be 0.01 mm or more in consideration of productivity and the like.

The original glass sheet G1 has dimensions of, for example, from 480 mm×320 mm to 3,350 mm×3,950 mm.

It is preferred that the original glass sheet G1 be formed through use of an overflow down-draw method, and a main surface S thereof be free from being polished. With the original glass sheet G1 formed as described above, a tempered glass sheet having high surface quality is obtained at low cost. A forming method and a processing state of the original glass sheet G1 may be appropriately selected. For example, the original glass sheet G1 may be formed through use of a float method, and the main surface S thereof may be polished.

Figure 1B:
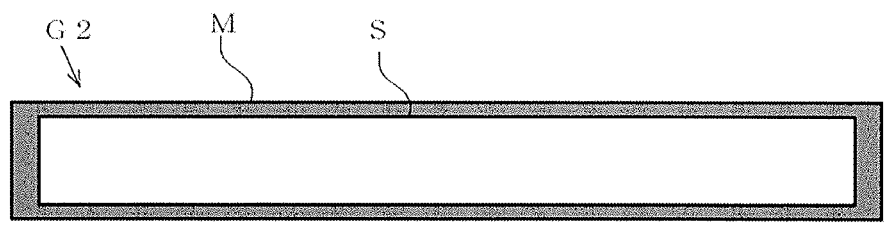
FIG. 1B is a view for illustrating an example of the method of manufacturing a tempered glass sheet and a glass sheet to be tempered according to the embodiment of the present invention.

Next, after the preparation step, the treatment in a film forming step illustrated in FIG. 1B is performed. The film forming step is a step of forming an ion permeation suppressing film M on the surface of the original glass sheet G1 to provide a glass sheet G2 with a film. The ion permeation suppressing film M is a film layer configured to suppress the permeation of an alkali metal ion on the surface of the original glass sheet G1 in a tempering step described later.

As a material for the ion permeation suppressing film M, any material may be used as long as the material can suppress the permeation of an alkali metal ion. However, it is preferred that the material have such mechanical strength and chemical durability that the material is less liable to be broken in a processing step and the tempering step described later. Specifically, it is preferred that the ion permeation suppressing film M have a Young's modulus that is from 0.5 time to 2.0 times a Young's modulus of the original glass sheet G1. When the Young's modulus of the ion permeation suppressing film M is 0.5 time or more the Young's modulus of the original glass sheet G1, the original glass sheet G1 can be sufficiently protected in the processing step and the like, and defects such as scratches are less liable to occur. Meanwhile, when the ion permeation suppressing film M has a Young's modulus that is 2.0 times or less the Young's modulus of the original glass sheet G1, the situation is less liable to occur in which the ion permeation suppressing film M is cracked to be broken in the processing step and like.

In order to obtain the strength characteristics as described above, it is preferred that the ion permeation suppressing film M be a metal oxide film, a metal nitride film, a metal carbide film, a metal oxynitride film, a metal oxycarbide film, a metal carbonitride film, or the like. In this case, the ion permeation suppressing film M may be a film containing one or more kinds selected from $SiO_2$, $Al_2O_3$, SiN, SiC, $Al_2O_3$, AlN, $ZrO_2$, $TiO_2$, $Ta_2O_5$, $Nb_2O_5$, $HfO_2$, and $SnO_2$.

Further, it is preferred that the ion permeation suppressing film M satisfy the following expression (1):

$$n1-n2 \leq 0.4 \tag{1}$$

where n1 represents a refractive index of the ion permeation suppressing film M at a wavelength of 550 nm, and n2 represents a refractive index of the original glass sheet G1 at a wavelength of 550 nm.

In this case, n1 and n2 satisfy preferably the following expression (2), more preferably the following expression (3), most preferably the following expression (4).

$$n1-n2 \leq 0.2 \tag{2}$$

$$n1-n2 \leq 0.1 \tag{3}$$

$$n1 < n2 \tag{4}$$

As described above, an antireflective effect can be imparted to the ion permeation suppressing film M by setting the refractive index n1 of the ion permeation suppressing film M within a predetermined range or less based on the refractive index n2 of the original glass sheet G1.

In order to decrease the refractive index n1 of the ion permeation suppressing film M, it is preferred that the ion permeation suppressing film M contain $SiO_2$ as a main component. A general glass has a refractive index of about 1.52, whereas $SiO_2$ has a refractive index of about 1.46. Thus, when the ion permeation suppressing film M contains $SiO_2$ as a main component, the refractive index of the ion permeation suppressing film M can be easily set to be smaller than that of the original glass sheet G1, and the function as an antireflective film can be easily imparted to the ion permeation suppressing film M.

The ion permeation suppressing film M may comprise a film formed of only $SiO_2$. Specifically, the ion permeation suppressing film M may have a composition containing, in terms of mass %, 99% or more of $SiO_2$. With such composition, the ion permeation suppressing film M can be formed easily at low cost. When the ion permeation suppressing film M contains $SiO_2$ as a main component as just described, it is preferred that any suitable additive having a Young's modulus higher than that of $SiO_2$ be added in addition to $SiO_2$ from the viewpoints of improving the ion permeation suppressing effect and obtaining high mechanical strength. Examples of such additive include $Al_2O_3$, SiN, SiC, $Al_2O_3$, AlN, $ZrO_2$, $TiO_2$, $Ta_2O_5$, $Nb_2O_5$, $HfO_2$, and $SnO_2$ described above. In particular, it is preferred to select $Al_2O_3$, which has a relatively low refractive index.

From the above-mentioned viewpoints, in this embodiment, the case where the ion permeation suppressing film M is an inorganic film containing $SiO_2$ as a main component and containing $Al_2O_3$ is described as an example. More specifically, the ion permeation suppressing film M contains as a composition in terms of mass %, 60% to 96% of $SiO_2$ and 4% to 40% of $Al_2O_3$.

In this embodiment, the content of $SiO_2$ is, in terms of mass %, preferably from 60% to 96%, more preferably from 65% to 90%, still more preferably from 70% to 85%. When the content of $SiO_2$ is 60% or more, the antireflective effect is easily obtained. Further, the uniformity of the ion permeation suppressing film M can be easily maintained. Therefore, the degree of tempering of the original glass sheet G1 is less liable to vary in the tempering step, and the strength quality of a product can be easily improved. Meanwhile, when the content of $SiO_2$ is 96% or less, the mechanical strength of the ion permeation suppressing film M increases to be less liable to be damaged in the manufacturing process.

It is preferred that the addition amount of $Al_2O_3$ be from 4% to 40%. When the content of $Al_2O_3$ is 4% or more, the ion permeation suppressing effect, and the effects of improvement of mechanical strength and chemical resistance are easily obtained. Meanwhile, when the content of $Al_2O_3$ is 40% or less, the productivity in the tempering step is improved without the permeation of an alkali metal ion being excessively inhibited.

With the ion permeation suppressing film M having the above-mentioned composition, the desired ion permeation suppressing effect, mechanical strength, and chemical resistance can be obtained with a relatively small film thickness. Thus, the manufacturing efficiency of a tempered glass sheet can be improved, for example, by shortening the film forming time of the ion permeation suppressing film M and reducing film material cost.

The thickness of the ion permeation suppressing film M is preferably from 5 nm to 300 nm, more preferably from 20 nm to 200 nm, still more preferably from 20 nm to 150 nm or from 40 nm to 120 nm, most preferably from 80 nm to 100 nm. When the thickness of the ion permeation suppressing film M is 5 nm or more, the permeation of an alkali metal ion can be sufficiently suppressed. Meanwhile, when the thickness of the ion permeation suppressing film M is 300 nm or less, a tempered glass sheet having sufficient strength is easily obtained without the permeation of an alkali metal ion being excessively inhibited.

In particular, when the thickness of the ion permeation suppressing film M is from 20 nm to 150 nm, high resistance is obtained in any of a plurality of modes of breakage described below.

(1) First mode in which there is a sharp protruding object at a drop destination, the protruding object pierces a surface compressive stress layer of a tempered glass to reach an internal tensile stress layer, to thereby cause a crack, and the crack extends due to the internal tensile stress to break the tempered glass.

(2) Second mode in which there is a blunt protruding object at a drop destination, and the protruding object forms a crack with such a depth as not to penetrate a surface compressive stress layer of a tempered glass and applies a tensile stress having a magnitude larger than that of a compressive stress to the surface of the tempered glass to cause the extension of the crack, to thereby break the tempered glass.

(3) Third mode in which an impact force is applied to an end surface of a tempered glass, and a minute crack or the like in the end surface extends to break the tempered glass.

When the ion permeation suppressing film M serves as an antireflective film, it is preferred that the optical film thickness (refractive index×physical film thickness) of the ion permeation suppressing film M be set to ¼ of a visible wavelength. Specifically, the optical film thickness of the ion permeation suppressing film M is preferably from 95 nm to 195 nm, more preferably from 130 nm to 160 nm.

As a method of forming the ion permeation suppressing film M, a physical vapor deposition (PVD) method, such as a sputtering method or a vacuum deposition method, a chemical vapor deposition (CVD) method, such as a thermal CVD method or a plasma CVD method, and a wet coating method, such as a dip coating method or a slit coating method, may be used. In particular, the sputtering method and the dip coating method are preferred. When the sputtering method is used, the ion permeation suppressing film M can be uniformly formed with ease. When the dip coating method is used, the ion permeation suppressing film M can be formed with high productivity simultaneously on both opposing main surfaces of a glass sheet.

Figure 1C:
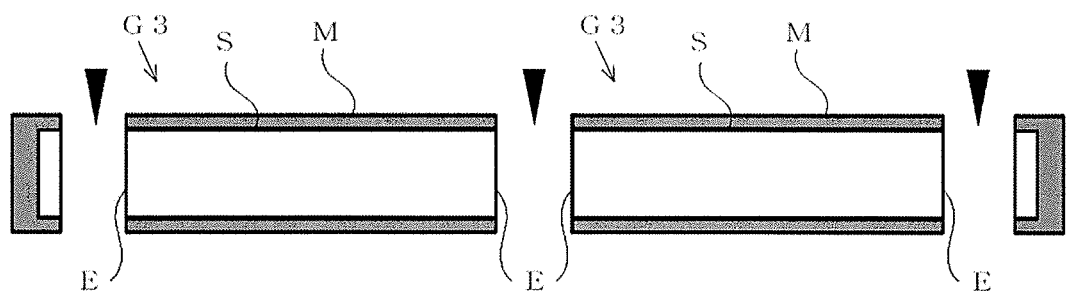
FIG. 1O is a view for illustrating an example of the method of manufacturing a tempered glass sheet and a glass sheet to be tempered according to the embodiment of the present invention.
FIG. 1D is a view for illustrating an example of the method of manufacturing a tempered glass sheet and a glass sheet to be tempered according to the embodiment of the present invention.
FIG. 1E is a view for illustrating an example of the method of manufacturing a tempered glass sheet and a glass sheet to be tempered according to the embodiment of the present invention.

Then, after the film forming step, the treatment in the processing step illustrated in FIG. 1C is performed. The processing step is a step of subjecting the glass sheet G2 with a film to at least any one of cutting processing, end-surface processing, and hole-opening processing, to thereby provide a glass sheet G3 to be tempered including an exposed portion E free from being covered with the ion permeation suppressing film M. That is, the processing to be performed with respect to the glass sheet G2 with a film may be one processing selected from the cutting processing, the end-surface processing, and the hole-opening processing, or two or more processings selected from those processings.

In this embodiment, the case where the glass sheet G3 to be tempered is obtained by subjecting the glass sheet G2 with a film to cutting processing as illustrated in FIG. 1C is described as an example. Specifically, a scribe line is formed in a preset cutting line of the glass sheet G2 with a film through use of a scribe chip, and the glass sheet G2 with a film is cleaved along the scribe line to provide the glass sheet G3 to be tempered. With such processing, the main surface S of the glass sheet G3 to be tempered remains covered with the ion permeation suppressing film M. Meanwhile, the end surface of the glass sheet G3 to be tempered forms the exposed portion E free from being covered with the ion permeation suppressing film M.

The above-mentioned method for cutting processing is an example, and for example, a scribe line may be formed in the glass sheet G2 with a film through use of laser light or the glass sheet G2 with a film may be fused through use of laser light. Further, the glass sheet G2 with a film may be mechanically cut through use of a tool, for example, a wire saw, or the glass sheet G2 with a film may be fused by partial etching using hydrofluoric acid.

Further, when the glass sheet G2 with a film is prepared in advance with dimensions as large as a product, the exposed portion E may be formed by performing end-surface processing or the like. Specifically, the exposed portion E may be formed by pressing a processing tool, such as a grindstone or an abrasive tape, onto the end surface and performing grinding processing and polishing processing. Alternatively, the end surface of the glass sheet G2 with a film may be subjected to etching treatment through use of hydrofluoric acid. When such processing is performed, the end surface of the glass sheet G2 with a film thus processed serves as the exposed portion E.

Further, regarding portions of a final product in which a loudspeaker, a camera, an earphone jack, a switch, a connector, and the like are arranged, the hole-opening processing may be performed in the glass sheet G2 with a film. The hole-opening processing may be performed, for example, by mechanical processing using a drill or the like, or may be performed by partial dissolution with laser light, etching, and the like. When such processing is performed, an inner peripheral surface of a formed hole serves as the exposed portion E (not shown).

Figure 1D:
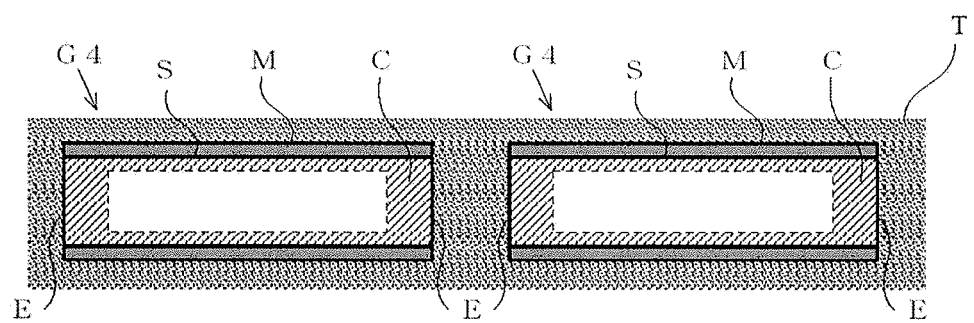
Figure 1E:
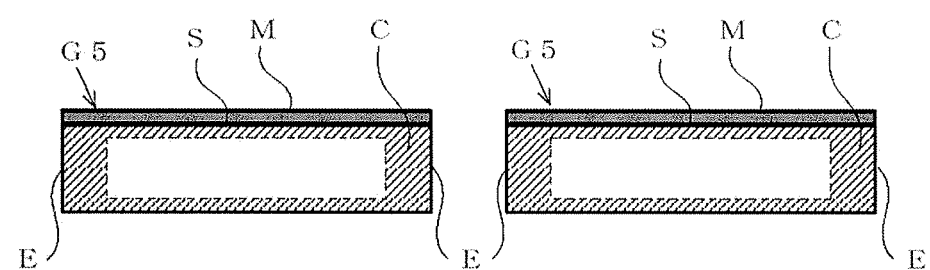

Then, after the processing step, the treatment in the tempering step illustrated in FIG. 1D is performed. The tempering step is a step of chemically tempering the glass sheet G3 to be tempered by an ion exchange process to provide a tempered glass sheet G4 with a film. Specifically, the glass sheet G3 to be tempered is immersed in a tempering liquid T of a potassium nitrate molten salt at from 350° C. to 500° C. for from 2 hours to 24 hours.

In the tempering step, a sodium ion on the surface of the glass sheet G3 to be tempered is exchanged for a potassium ion in the tempering liquid T to provide the tempered glass sheet G4 including the compressive stress layer C on the surface. In this case, in a site (main surface S) of the surface of the glass sheet G3 to be tempered, in which the ion permeation suppressing film M is formed, ion exchange is suppressed as compared to that in the exposed portion E in which the surface of the original glass sheet G1 is exposed, and hence the depth of the compressive stress layer becomes small. In other words, in the exposed portion E, ion exchange proceeds easily as compared to that in the site in which the ion permeation suppressing film M is formed, and the depth of the compressive stress layer becomes large. Thus, in the tempered glass sheet G4, the depth of the compressive stress layer of the main surface becomes smaller than that of the end surface. Therefore, the internal tensile stress, is smaller than that of a tempered glass that has been tempered as a whole, and the end portion has high impact resistance. Thus, breakage caused by the extension of a crack from the end portion can be suitably suppressed.

Further, when the above-mentioned inorganic composition material is adopted as the ion permeation suppressing film M, even in the case where the glass sheet to be tempered is immersed in the tempering liquid T with the film being formed, the ion permeation suppressing film M is less liable to degrade the tempering liquid T as compared to a conventional organic protective film or the like.

Treatment conditions such as a treatment temperature and an immersion time in the tempering step may be appropriately set depending on the characteristics required for the tempered glass sheet G4. It is preferred that the treatment conditions be adjusted so that the depth of the compressive stress layer of the main surface S of the tempered glass sheet G4 is smaller than that of the compressive stress layer of the exposed portion E.

The ion permeation suppressing film M also serves as a protective coat or an antireflective film of an electronic device. Therefore, the tempered glass sheet G4 can also be directly used as a product, but the ion permeation suppressing film M may be peeled depending on the application. In a peeling step illustrated in FIG. 1E, the ion permeation suppressing film M is peeled from the tempered glass sheet G4 to provide a tempered glass sheet G5.

Specifically, an etchant is caused to adhere to the tempered glass sheet G4 to remove the ion permeation suppressing film M. When the ion permeation suppressing film M is a film containing $SiO_2$, for example, a solution containing fluorine, TMAH, EDP, KOH, and the like can be used as the etchant, and in particular, it is preferred that a hydrofluoric acid solution be used as the etchant. In the peeling step, only the ion permeation suppressing film M on one main surface side may be removed, and the ion permeation suppressing films M on both the main surfaces may be removed. Further, the ion permeation suppressing film M may be partially removed in each main surface or the whole ion permeation suppressing film M may be removed.

When the ion permeation suppressing film M is removed from one surface side or partially removed, the film can be removed by causing the etchant to partially adhere to the film through use of a spray, a roll, a brush, or the like, or partially masking the tempered glass sheet G4 and immersing the tempered glass sheet G4 in the etchant.

When the whole ion permeation suppressing film M is removed, the whole tempered glass sheet G4 may be immersed in the etchant. When the whole tempered glass sheet G4 is immersed in the etchant as just described, the tempered glass sheet G5, in which a microcrack that causes breakage is reduced, and the strength is further improved, is obtained.

As described above, in the method of manufacturing a tempered glass sheet according to the embodiment of the present invention, the end surface can be easily formed into the exposed portion E in the processing step, and the tempered glass sheets G4 and G5 having less breakage from the end surface can be manufactured efficiently. With the above-mentioned ion permeation suppressing film M, the original glass sheet G1 can be protected with high mechanical strength and chemical durability while the permeation of an alkali metal ion is suitably suppressed with an excessively small film thickness. Thus, the tempered glass sheets G4 and G5 can be manufactured efficiently with high productivity.

The surface of the glass sheet G3 to be tempered obtained in the manufacturing process of the tempered glass sheets G4 and G5 is protected with the ion permeation suppressing film M M. Therefore, for example, when the film forming step and the tempering step are present far away from each other, breakage during transportation can be prevented. Further, the tempering treatment in the tempering step can be directly performed without peeling the ion permeation suppressing film M. Therefore, there is an advantage in that it is not necessary to peel the protective film before the tempering step.

opening processing in advance before the ion permeation suppressing film M is formed. In addition, in this case, the processed surface (end surface) of the glass sheet to be tempered may be subjected to the treatment in the film forming step and the tempering step, for example, under a state in which the processed surface is subjected to masking with a resin or the like.

Modification Example

In the above-mentioned embodiment, the case where the ion permeation suppressing film M that is a single layer is formed in the film forming step is described as an example. However, a plurality of film layers including the ion permeation suppressing film M, which have different characteristics, may be formed on the main surface S. For example, a step of forming an easy peeling film between the ion permeation suppressing film and the main surface S may be further included (not shown). The easy peeling film is, for example, an inorganic film containing at least any one of $In_2O_3$ and $ZnO$. The easy peeling film containing $In_2O_3$ and $ZnO$ can be easily peeled with an acid etchant, for example, hydrochloric acid. Further, the easy peeling film containing $ZnO$ can be easily peeled with an alkali etchant, for example, potassium hydroxide. Through the formation of such easy peeling film, the ion permeation suppressing film M can be easily peeled in the peeling step. The easy peeling film can be formed by any method, such as a sputtering method, a CVD method, a dip coating method, a spin coating method, and a spray coating method.

Now, Examples of the present invention are described in detail.

Example 1

In Table 1, Nos. 1 to 3 represent Examples of the present invention, and No. 4 represents Comparative Example of the present invention.

TABLE 1

|  |  | No. 1 | No. 2 | No. 3 | No. 4 |
|---|---|---|---|---|---|
| Film composition | $SiO_2$ | 100 | 96 | 85 | 0 |
| (mass %) | $Al_2O_3$ | 0 | 4 | 15 | 0 |
| Film thickness (μm) |  | 0.1 | 0.1 | 0.1 | Absent |
| FSM-6000 Surface compressive stress CS1 (MPa) |  | 667 | Unmeasured | Unmeasured | 773 |
| FSM-6000 Surface stress depth DOL1 (μm) |  | 26 | Unmeasured | Unmeasured | 49 |
| FSM-6000 Internal tensile stress CT (MPa) |  | 26 | Unmeasured | Unmeasured | 64 |
| WPA-micro End surface stress depth DOL2 (μm) |  | 49 | 49 | 49 | 49 |
| WPA-micro Surface stress depth DOL3 (μm) |  | 41 | 41 | 43 | 49 |
| Film Young's modulus E1 (GPa) |  | 72 | 75 | 82 | — |
| Glass sheet Young's modulus E2 (GPa) |  | 70 | 70 | 70 | 70 |
| E1/E2 |  | 1.0 | 1.1 | 1.2 | — |
| Reflectance (%: λ = 550 nm) |  | 3.3 | 3.8 | 4.0 | 4.2 |
| Film refractive index n1 (λ = 550 nm) |  | 1.47 | 1.48 | 1.50 | — |
| Glass sheet refractive index n2 (λ = 550 nm) |  | 1.52 | 1.52 | 1.52 | 1.52 |

The above-mentioned material for the ion permeation suppressing film M is an example, and any material may be used as long as the film is capable of suppressing the permeation of an alkali metal ion.

Before and after each of the preparation step, the film forming step, the processing step, the tempering step, and the peeling step, the glass sheet may be appropriately subjected to washing and drying treatment.

The glass sheet to be tempered may be subjected to any of cutting processing, end-surface processing, and hole- Each sample in Table 1 was manufactured as described below. First, glass raw materials were mixed and melted so as to contain as a glass composition in terms of mass %, 61.6% of $SiO_2$, 19.6% of $Al_2O_3$, 0.8% of $B_2O_3$, 16% of $Na_2O$, and 2% of $K_2O$, and the resultant was formed through use of an overflow down-draw method to provide a plurality of original glass sheets each having a thickness of 0.4 mm. Then, an ion permeation suppressing film having a composition and a thickness shown in Table 1 was formed on each of the original glass sheets obtained in the above through use of a sputtering method. After that, the resultant was cut out to a rectangular shape having dimensions of 65 mm×130 mm through scribe cleaving to provide glass sheets to be tempered each including an exposed portion on an end surface. Regarding Sample No. 4, the above-mentioned cutting was performed without performing the above-mentioned film formation. Then, the obtained glass sheets to be tempered were chemically tempered by being immersed in a potassium nitrate solution at 430° C. for 1 hour, and the resultant was washed with pure water and dried naturally to provide tempered glass sheet samples Nos. 1 to 3 shown in Table 1.

Each glass sample obtained as described above was subjected to the following measurement test.

A surface compressive stress value CS1 and a surface stress depth DOL1 were calculated by observing the number of interference fringes and an interval thereof with a stress meter (FSM-6000 manufactured by Orihara Manufacturing Co., Ltd.). An internal tensile stress CT was calculated by the following expression (5) through use of the surface compressive stress value CS1 and the surface stress depth DOL1.

$$CT=(CS1 \times DOL1)/(t-2DOL1) \quad (5)$$

t: Thickness of glass sample (mm)

It was difficult to measure a minute compressive stress depth of an end surface with the above-mentioned FSM-6000. Therefore, an end surface stress depth DOL2 was measured separately by the following method. Specifically, each of the above-mentioned samples was sliced in a direction perpendicular to a main surface to provide a sectional sample having a thickness of 200 μm. Then, the depth of a compressive stress layer in an end surface portion of each sectional sample was observed and measured through use of a polarizing microscope (WPA-micro manufactured by Photonic Lattice Inc.). Further, for comparison, a surface stress depth was measured as DOL3 by the same method.

A film Young's modulus E1, which was a Young's modulus of the ion permeation suppressing film, was calculated by the following expressions (6) to (8) through use of a mass ratio of each component, a known density of each component, and a known Young's modulus of each component in a film composition.

$$1/E1 = V_{SiO2}/E_{SiO2} + V_{Al2O3}/E_{Al2O3} \quad (6)$$

$V_{SiO2}$: volume ratio of $SiO_2$
$V_{Al2O3}$: volume ratio of $Al_2O_3$
$E_{SiO2}$: Young's modulus of $SiO_2$ (=72 GPa)
$E_{Al2O3}$: Young's modulus of $Al_2O_3$ (=380 GPa)

$$V_{SiO2}(W_{SiO2}/d_{SiO2})/(W_{SiO2}/d_{SiO2}+W_{Al2O3}/d_{Al2O3}) \quad (7)$$

$$V_{Al2O3}=W_{Al2O3}/d_{Al2O3})/W_{SiO2}/d_{SiO2}+W_{Al2O3}/d_{Al2O3}) \quad (8)$$

$W_{SiO2}$: mass ratio of $SiO_2$ in film composition
$W_{Al2O3}$: mass ratio $Al_2O_3$ in film composition
$d_{SiO2}$: density of $SiO_2$ (=2.65 g/cm$^3$)
$d_{Al2O3}$: density of $Al_2O_3$ (=3.95 g/cm$^3$)

A glass sheet Young's modulus E2 is a Young's modulus of an original glass sheet, which is a value measured through use of a resonance method.

A reflectance is a value obtained by measuring a reflectance of one surface of each tempered glass sheet sample at a wavelength of 550 nm through use of a microspectrophotometer (USPM-RU III manufactured by Olympus Corporation).

The film refractive index n1 is a value obtained by measuring a refractive index of the ion permeation suppressing film of each sample at a wavelength of 550 nm through use of the microspectrophotometer (USPM-RU III manufactured by Olympus Corporation).

The glass sheet refractive index n2 is a value obtained by measuring a refractive index of the original glass sheet at a wavelength of 550 nm through use of the microspectrophotometer (USPM-RU III manufactured by Olympus Corporation).

As shown in Table 1, Sample Nos. 1 to 3 of this Example were each prepared by being tempered under a state in which the ion permeation suppressing film was formed on a main surface, and an exposed portion was formed on an end surface. Therefore, the end surface of each of the samples has a compressive stress substantially equal to that of the sample of Comparative Example, and the surface compressive stress thereof is smaller than that of Sample No. 4 of Comparative Example. That is, the following is considered. In Sample Nos. 1 to 3, the balance in compressive stress is set easily and suitably. As a result, the internal tensile stress is reduced to make it difficult for self-destruction to occur, and high impact resistance is obtained in the end surface.

Example 2

Figure 2:
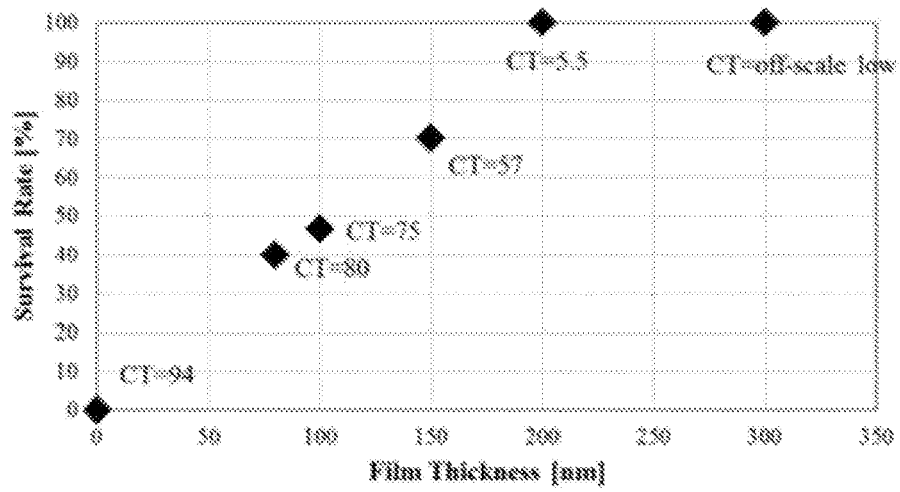
FIG. 2 is a graph for showing results of a ball drop test using sandpaper #100 regarding the tempered glass sheet according to the embodiment of the present invention.
Figure 3:
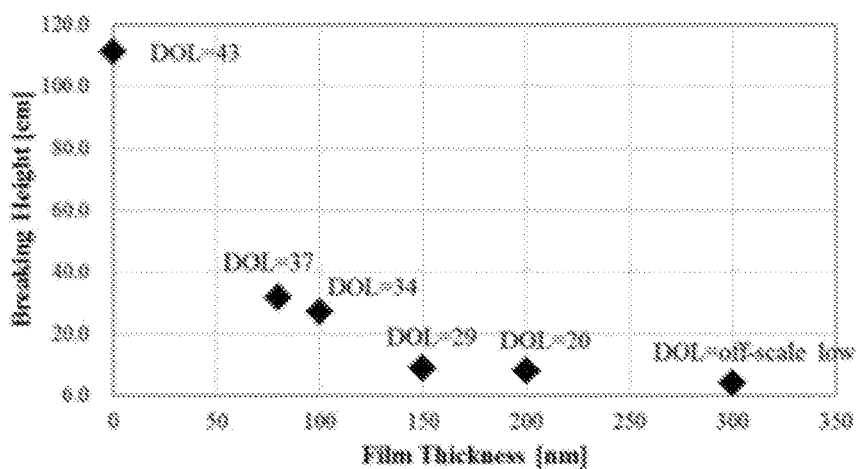
FIG. 3 is a graph for showing results of a ball drop test using sandpaper #320 regarding the tempered glass sheet according to the embodiment of the present invention.
Figure 4:
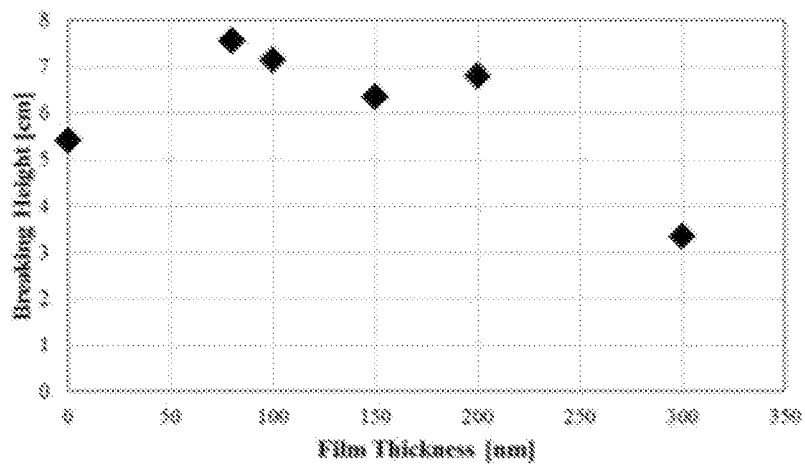
FIG. 4 is a graph for showing results of an end surface impact test regarding the tempered glass sheet according to the embodiment of the present invention.

FIG. 2 to FIG. 4 are each a graph for showing resistance to different modes of breakage of the tempered glass according to the embodiment of the present invention. First, a plurality of tempered glass samples including ion permeation suppressing films having different thicknesses were prepared by the same method as in the above-mentioned Example No. 1. Specifically, a plurality of samples having film thicknesses of 0 nm, 80 nm, 100 nm, 150 nm, 200 nm, and 300 nm were prepared, and each of the samples was subjected to breaking tests corresponding to the above-mentioned first to third modes. Specifically, a ball drop test using sand paper #100, a ball drop test using sand paper #320, and an end surface impact test were performed.

The ball drop test using sandpaper #100 is a test assuming the above-mentioned first mode of breakage. Specifically, a tempered glass having dimensions of 50 mm in length and 50 mm in width and sandpaper #100 having a dimension of 15 mm per side (arranged so that a rubbing surface thereof is brought into contact with the tempered glass) were arranged on a base made of granite in the stated order, and a steel ball of 4 g was dropped onto the sand paper from a height of 5 cm. Then, evaluation was made based on whether or not split destruction has occurred. Regarding each of the above-mentioned film thicknesses, thirty samples were tested, and a survival rate was determined based on the number of the samples in which split destruction has not occurred. The sand paper was replaced by new sand paper for each sample.

FIG. 2 is a graph for showing results of a ball drop test using sandpaper #100. In FIG. 2, the horizontal axis represents the thickness of the ion permeation suppressing film, and the vertical axis represents a survival rate. In FIG. 2, it is shown that the survival rate becomes higher as the thickness of the ion permeation suppressing film becomes larger, and breakage is less liable to occur in the first mode.

The ball drop test using sandpaper #320 is a test assuming the above-mentioned second mode of breakage. Specifically, an acrylic sheet having a sheet thickness of 30 mm, sand paper #320 having a dimension of 15 mm per side (arranged so that a rubbing surface thereof is brought into contact with a tempered glass, the tempered glass having dimensions of 50 mm in length and 50 mm in width, and an acrylic sheet having a sheet thickness of 4 mm are laminated and arranged on a base made of a SUS surface plate in the stated order. A steel ball of 130 g is dropped onto the acrylic sheet arranged in the uppermost stage, and a height at which the tempered glass is broken is measured. More specifically, a steel ball was dropped from a height of 5 cm while the dropping height was increased in increments of 5 cm, and a height at which the sample was broken was recorded. The heights at which the sample was broken were subjected to Weibull plot, and a height (hereinafter referred to as "breaking height") at which the breaking rate reached 63% was determined as an average value. When no split occurred even when a crack was formed, it was determined that breakage occurred when the crack formed in a perpendicular direction reached a depth of a half or more of the sheet thickness.

FIG. 3 is a graph for showing results of a ball drop test using sandpaper #320. In FIG. 3, the horizontal axis represents the thickness of the ion permeation suppressing film, and the vertical axis represents a breaking height. In FIG. 3, it is shown that the dropping height of the steel ball at the time of breakage becomes lower as the thickness of the ion permeation suppressing film becomes smaller, and breakage is less liable to occur in the second mode.

The end surface impact test is a test assuming the above-mentioned third mode of breakage. Specifically, as disclosed in CN 204514736 U, a head of a hammer member fixed onto an end portion on a handle side so as to be swingable in a height direction was raised and was caused to collide with an end surface of a sample clamped in a horizontal posture. Then, a height at which the sample was broken was measured. The length of the hammer from a pivot point to the head was set to 500 mm, the weight of an arm was set to 225 g, and the weight of the head was set to 11.3 g. The hammer member was caused to collide with the end surface of the sample while the raising height was increased in increments of 1 cm through use of the device, and raising heights at which the sample was broken were recorded. The heights at which the sample was broken were subjected to Weibull plot, and a height (hereinafter referred to as "breaking height") at which the breaking rate reached 63% was determined as an average value.

FIG. 4 is a graph for showing results of an end surface impact test. In FIG. 4, the horizontal axis represents the thickness of the ion permeation suppressing film, and the vertical axis represents the breaking height. In FIG. 4, it is shown that high strength is exhibited when the thickness of the ion permeation suppressing film falls within a range of more than 0 nm and less than 300 nm, and the end surface strength of the ion permeation suppressing film outside of the range is lower than that within the range.

It is desired that a tempered glass for a display cover of a portable device be less liable to be broken in any of the first to third modes. As shown in FIG. 2 to FIG. 4, the thickness of the ion permeation suppressing film falls within a range of preferably from 50 nm to 150 nm, more preferably from 80 nm to 100 nm, because the tempered glass is less liable to be broken in any mode.

INDUSTRIAL APPLICABILITY

The tempered glass sheet and the manufacturing method therefor of the present invention are useful as, for example, a glass substrate to be used in a touch panel display or the like and a manufacturing method therefor.

REFERENCE SIGNS LIST

G1 original glass sheet
G2 glass sheet with film
G3 glass sheet to be tempered
G4, G5 tempered glass sheet
M ion permeation suppressing film
E exposed portion

The invention claimed is:

1. A method of manufacturing a tempered glass sheet that has been tempered by an ion exchange process, the method comprising:
   a film forming step of covering a surface of an original non-tempered glass sheet with an ion permeation suppressing film configured to suppress permeation of an alkali metal ion, to thereby provide a non-tempered glass sheet with a film;
   a processing step of subjecting, after the film forming step, the non-tempered glass sheet with the film to cutting processing, to thereby provide a non-tempered glass sheet to be tempered comprising an exposed portion free from being covered with the ion permeation suppressing film on a cut end surface; and
   a tempering step of chemically tempering, after the processing step, the non-tempered glass sheet with the film and comprising the exposed portion to be tempered by the ion exchange process to provide the tempered glass sheet.

2. The method of manufacturing a tempered glass sheet according to claim 1, wherein the film forming step comprises forming, as the ion permeation suppressing film, at least any one of a metal oxide film, a metal nitride film, a metal carbide film, a metal oxynitride film, a metal oxycarbide film, and a metal carbonitride film.

3. The method of manufacturing a tempered glass sheet according to claim 2, wherein the film forming step comprises forming, as the ion permeation suppressing film, a film layer comprising at least any one of $SiO_2$, $Al_2O_3$, SiN, SiC, AlN, $ZrO_2$, $TiO_2$, $Ta_2O_5$, $Nb_2O_5$, $HfO_2$, and $SnO_2$.

4. The method of manufacturing a tempered glass sheet according to claim 3, wherein the film forming step comprises forming, as the ion permeation suppressing film, an inorganic film having a composition comprising, in terms of mass %, 60% to 96% of $SiO_2$ and 4% to 40% of $Al_2O_3$.

5. The method of manufacturing a tempered glass sheet according to claim 3, wherein the film forming step comprises forming, as the ion permeation suppressing film, an inorganic film having a composition comprising, in terms of mass %, 99% or more of $SiO_2$.

6. The method of manufacturing a tempered glass sheet according to claim 1, wherein the film forming step comprises forming the ion permeation suppressing film to a thickness of from 20 nm to 150 nm.

7. The method of manufacturing a tempered glass sheet according to claim 1, wherein the ion permeation suppressing film has a Young's modulus that is from 0.5 time to 2.0 times a Young's modulus of the original non-tempered glass sheet.

8. The method of manufacturing a tempered glass sheet according to claim 1, wherein the following expression (1) is satisfied:

$$n1 - n2 \leq 0.4 \tag{1}$$

where n1 represents a refractive index of the ion permeation suppressing film, and n2 represents a refractive index of the original non-tempered glass sheet.

9. The method of manufacturing a tempered glass sheet according to claim 1, wherein the tempering step comprises immersing the non-tempered glass sheet to be tempered in a potassium nitrate molten salt at from 350° C. to 500° C. for from 2 hours to 24 hours.

10. The method of manufacturing a tempered glass sheet according to claim 1, wherein the original non-tempered glass sheet comprises, as a glass composition in terms of mass %, 45% to 75% of $SiO_2$, 1% to 30% of $Al_2O_3$, 0% to 20% of $Na_2O$, and 0% to 20% of $K_2O$ and has a thickness of from 0.01 mm to 1.5 mm.

11. The method of manufacturing a tempered glass sheet according to claim 1, further comprising a step of forming an easy peeling film between the ion permeation suppressing film and the original non-tempered glass sheet.

12. The method of manufacturing a tempered glass sheet according to claim 11, wherein the easy peeling film comprises an inorganic film comprising at least any one of $In_2O_3$ and ZnO.

13. The method of manufacturing a tempered glass sheet according to claim 1, further comprising, after the tempering step, a peeling step of peeling the ion permeation suppressing film from at least one main surface of the tempered glass sheet.

14. The method of manufacturing a tempered glass sheet according to claim 1, further comprising dividing the non-tempered glass sheet with the film by the cutting processing into plural pieces, and obtaining a plurality of the non-tempered glass sheets to be tempered each having the exposed portion on the cut end surface.

15. The method of manufacturing a tempered glass sheet according to claim 1, further comprising subjecting the cut end surface to an end-surface processing after the cutting processing and before the tempering step.

16. The method of manufacturing a tempered glass sheet according to claim 1, wherein the tempering step comprises immersing the non-tempered glass sheet to be tempered in a tempering liquid.

* * * * *